US008817069B2

(12) United States Patent
Alessandrini et al.

(10) Patent No.: US 8,817,069 B2
(45) Date of Patent: Aug. 26, 2014

(54) METHOD AND A DEVICE FOR FILLING OCCLUDED AREAS OF A DEPTH OR DISPARITY MAP ESTIMATED FROM AT LEAST TWO IMAGES

(75) Inventors: David Alessandrini, Mûrs-Erigne (FR); Raphaële Balter, Saint Sulpice la Foret (FR); Stéphane Pateux, Rennes (FR)

(73) Assignee: Orange, Paris (FR)

( * ) Notice: Subject to any disclaimer, the term of this patent is extended or adjusted under 35 U.S.C. 154(b) by 411 days.

(21) Appl. No.: 12/996,787

(22) PCT Filed: Jun. 22, 2009

(86) PCT No.: PCT/FR2009/051184
§ 371 (c)(1),
(2), (4) Date: Dec. 8, 2010

(87) PCT Pub. No.: WO2010/007285
PCT Pub. Date: Jan. 21, 2010

(65) Prior Publication Data
US 2011/0080464 A1   Apr. 7, 2011

(30) Foreign Application Priority Data

Jun. 24, 2008   (FR) .................................... 08 54157

(51) Int. Cl.
*H04N 13/00*   (2006.01)
*G06T 5/00*   (2006.01)
*G06T 7/00*   (2006.01)
*G06T 5/30*   (2006.01)

(52) U.S. Cl.
CPC .............. *G06T 5/005* (2013.01); *G06T 7/0075* (2013.01); *G06T 2207/10012* (2013.01); *G06T 2207/20032* (2013.01); *G06T 5/30* (2013.01)
USPC .............................. 348/42; 382/100; 382/154

(58) Field of Classification Search
CPC ............. G06T 1/00; G06T 5/00; G06T 5/001; G06T 7/0051; G06K 1/00
See application file for complete search history.

(56) References Cited

U.S. PATENT DOCUMENTS

| 5,909,251 | A  | * | 6/1999  | Guichard et al. | 348/416.1 |
| 6,269,175 | B1 | * | 7/2001  | Hanna et al.    | 382/107   |
| 7,599,547 | B2 | * | 10/2009 | Sun et al.      | 382/154   |
| 8,160,391 | B1 | * | 4/2012  | Zhu et al.      | 382/284   |
| 8,280,149 | B2 | * | 10/2012 | Yu et al.       | 382/154   |

(Continued)

OTHER PUBLICATIONS

Chaohui et al., "Efficient Stereo Disparity Estimation for Intermediate View Synthesis," The 47th IEEE International Midwest Symposium on Circuits and Systems, vol. 3, pp. III_483-III_486 (Jul. 25, 2004).

(Continued)

*Primary Examiner* — Christopher S Kelley
*Assistant Examiner* — Deirdre Beasley
(74) *Attorney, Agent, or Firm* — Drinker Biddle & Reath LLP (57) ABSTRACT

A method of filling occluded areas of a depth or disparity map estimated from at least two images and consisting of a matrix of pixels forming a set of lines and columns, each pixel of the map being associated with a depth or disparity value (pixel value) and any pixel of an occluded area (invalid pixel) being associated with a pixel value identifiable as being invalid. This method comprises a step of processing each line of the map pixel by pixel in a predefined direction and assigning each invalid pixel Pi encountered on a current line a value determined as a function of the values associated with the pixels in a predefined vicinity around the first valid pixel P1, if any, that follows the invalid pixel Pi on the current line and the value V(P1) of which corresponds to a greater depth or a lesser disparity relative to the value V(P0) of the last valid pixel P0, if any, that precedes the invalid pixel Pi on the current line.

11 Claims, 6 Drawing Sheets

(56) References Cited

U.S. PATENT DOCUMENTS

| | | | | |
|---|---|---|---|---|
| 8,315,426 B2* | 11/2012 | Yea et al. | | 382/100 |
| 8,611,696 B1* | 12/2013 | Zhu et al. | | 382/284 |
| 2004/0240725 A1* | 12/2004 | Xu et al. | | 382/154 |
| 2006/0078180 A1* | 4/2006 | Berretty et al. | | 382/128 |
| 2006/0082575 A1* | 4/2006 | Auberger et al. | | 345/421 |
| 2007/0116352 A1* | 5/2007 | Duquette et al. | | 382/151 |
| 2007/0122028 A1* | 5/2007 | Sun et al. | | 382/154 |
| 2009/0067705 A1* | 3/2009 | Yu et al. | | 382/154 |
| 2013/0010063 A1* | 1/2013 | Redmann | | 348/43 |
| 2013/0136338 A1* | 5/2013 | Asente et al. | | 382/154 |

OTHER PUBLICATIONS

Liangzhong et al., "Dynamic Programming Based Ray-Space Interpolation for Free-Viewpoint Video System," High Technology Letters, Science Press, Beijing, CN, vo. 14 (1), pp. 72-76 (Mar. 1, 2008).

Morvan et al., "Design Considerations for View Interpolation in a 3D Video Coding Framework," retrieved from internet website: http://vca.ele.tue.nl/publications/data/Morvan2006b.pdf, pp. 1-8 (Jun. 2006).

Ogale et al., "Occlusions in Motion Processing," retrieved from internet website: http://www.bmva.ac.uk/meetings/04/24mar/strip_aloimonos.pdf, pp. 1-3 (Mar. 2004).

Wei et al., "Disparity Estimation with Edge-based Matching and Interpolation," Proceedings of 2005 International Symposium on Intelligent Signal Processing and Communication Systems, 2005, ISPACS 2005, Hong Kong Dec. 13-16, 2005, Piscataway, NJ, USA, IEEE, pp. 153-156 (Dec. 13, 2005).

* cited by examiner

METHOD AND A DEVICE FOR FILLING OCCLUDED AREAS OF A DEPTH OR DISPARITY MAP ESTIMATED FROM AT LEAST TWO IMAGES

CROSS-REFERENCE TO RELATED APPLICATIONS

This application is the U.S. national phase of the International Patent Application No. PCT/FR2009/051184 filed Jun. 22, 2009, which claims the benefit of French Application No. 08 54157 filed Jun. 24, 2008, the entire content of which is incorporated herein by reference.

FIELD OF THE INVENTION

The present invention concerns processing digital images and in particular a technique for filling occluded areas in a depth or disparity map estimated from at least two images.

BACKGROUND

Maps known as depth maps or disparity maps are conventionally used in three-dimensional video (3D video) applications such as display in relief, reconstruction of scenes in three dimensions, and virtual navigation in video images. These maps are obtained by a process of estimation from at least two images of the same scene coming from stereoscopic videos or multiview videos captured by a plurality of video cameras or corresponding to different times in the same video.

Two approaches are generally used in the particular situation of transmitting stereoscopic content. A first approach uses a pair of conventional video cameras positioned so as to reproduce the human visual system, each camera corresponding to one eye. The two monoscopic video sequences captured are transmitted to the user. Another approach transmits only one monoscopic color video sequence accompanied by depth information associated with each pixel. In this situation, one or more virtual views may be synthesized at the user end by means of rendering algorithms based on depth maps. This depth map approach has the particular advantage of reducing the total bandwidth used for transmission and is directly applicable to video coding with data compression.

To define what are conventionally referred to as depth maps and disparity maps, and in order to simplify the explanation, consider the particular situation of binocular stereo vision where two images of the same scene from two different points of view are produced, for example by a video camera. The two images are conventionally referred to as the right-hand image and the left-hand image. In this context, a depth map corresponding to a given image (a right-hand image or a left-hand image, for example) is a digital image each pixel of which is associated with a value representing a color (for example a shade of grey) that is characteristic of the distance of the pixel concerned from the camera.

Figure 1:
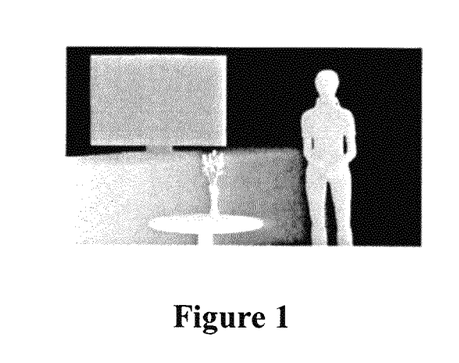
FIG. 1, already commented on, represents one example of a depth map.

FIG. 1 shows a depth map in which the distance of the objects appearing in the image relative to the camera that filmed a scene is represented by a grey level from white for the nearest objects to black for the farthest objects. Thus in this example the table and the vase containing flowers, which are of lighter shade, are the nearest objects of the scene (foreground) and the screen represented appears to be the farthest object (background).

Figure 2A:
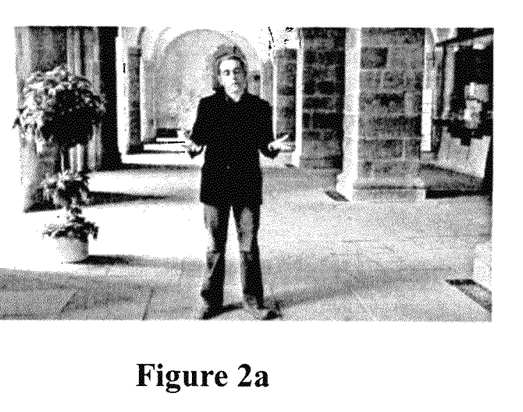
FIGS. 2a and 2b, already commented on, represent a pair of stereoscopic images from which a depth map may be estimated.
Figure 2B:
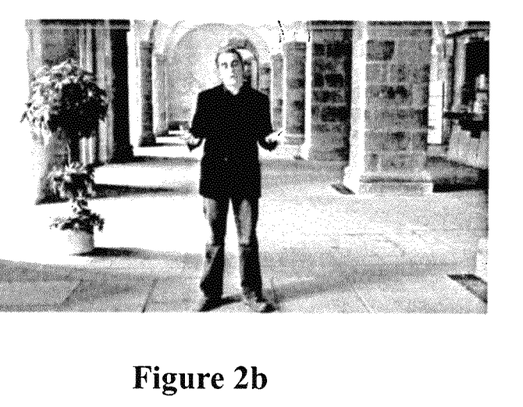

FIGS. 2a and 2b represent a pair of stereoscopic images from which a depth map may be estimated. FIG. 2a represents the left-hand image and FIG. 2b represents the right-hand image.

A disparity map embodies the result of stereoscopic matching of the above-mentioned two images. Stereoscopic matching consists in finding in the left-hand and right-hand images pixels that are homologous, i.e. pixels that are the projection of the same entity in the scene. The disparity map is one way of visually representing the results of this matching: each pixel of the disparity map represents the amplitude of the disparity, i.e. the distance between the position of a pixel in the left-hand image and that of its counterpart in the right-hand image. Thus each pixel of the disparity map is associated with a value representing a color characteristic of the amplitude of the disparity. The conventional process again uses shades of grey: for example, the darker the pixel, the smaller the disparity, with completely white pixels representing pixels with no counterparts in one of the two images.

It is easy to demonstrate that the higher the depth value associated with a given pixel of an image, the lower the corresponding disparity value. The depth and the disparity thus being two inversely proportional magnitudes, the present invention may be applied equally to a depth map or a disparity map. In the remainder of the description, depth maps and disparity maps are referred to interchangeably and the term map refers to either of these maps.

The use of depth or disparity maps is of primary importance in the context of emerging techniques such as virtual navigation in a video, display in relief, 3D modeling, and video coding. Depth maps obtained by prediction from different views can also be used for compression applications that perform compression by predicting views by using depth maps. In this type of approach, depth maps are used to predict corresponding views in other videos of the same scene in order to limit the transmission of redundant information, notably with MVD (Multiview Video and Depth) data consisting of a plurality of videos and associated depth maps. Whatever the final application, the accuracy of these maps is therefore critical to the quality of the reconstructed views and to efficient video compression in coding applications.

In particular, the quality of a depth/disparity map is linked to the presence of occluded areas in the map concerned. Occluded areas are areas of the map for which the pixels have no counterpart in one of the images, with a part visible in only one image. These occluded areas are essentially caused by objects in the scene referred to as occluding objects, i.e. objects which, in one of the two images (right-hand or left-hand), mask a particular region of the represented scene that is directly visible in the other image. Occluded areas are essentially found around boundaries caused by depth discontinuities in the maps.

Figure 3:
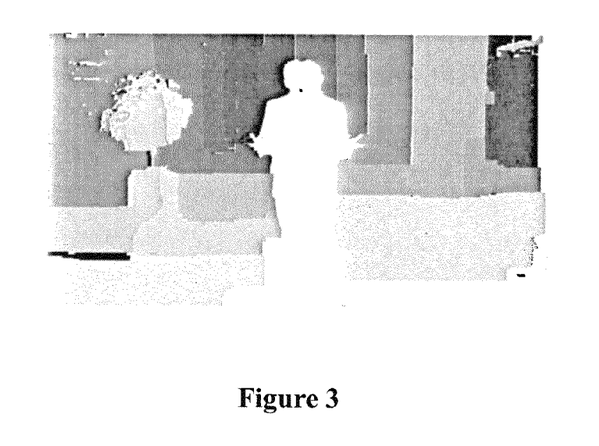
FIG. 3, already commented on, represents one example of a disparity map estimated using a known algorithm based on graph cuts.

FIG. 3 represents an example of a disparity map estimated using a known algorithm based on graph cuts. To be more precise, the algorithm used is that described for example in the document "Multi-camera scene reconstruction via graph cuts", V. Kolmogorov and R. Zabih, Proceedings of the European Conference on Computer Vision, 2002.

In the image represented, the white areas are occluded areas detected by the above-mentioned graph cuts algorithm and for which it has not been possible to determine a pixel value because of the lack of counterparts in the left-hand and right-hand images represented by FIGS. 2a and 2b, respectively.

It is therefore necessary to take these occluded areas in the depth or disparity maps into account in order to enhance the quality of the images obtained by a reconstruction or synthesis process based on these maps. It is a question in particular of detecting and/or filling gaps in the occluded areas corresponding to the missing information.

Known techniques for processing the above-mentioned depth or disparity map defects include in particular a first category of techniques that operate on images reconstructed from depth or disparity maps.

Solutions of this first category are described for example in the document "Stereoscopic imaging: Filling disoccluded areas in image-based rendering", C. Vázquez, W. J. Tam, and F. Speranza, Proceedings of the SPIE Three-Dimensional TV, Video, and Display, Vol. 6392, pp. 0D1-0D12, 2006. According to those solutions, gaps in the reconstructed images are filled by propagating a value obtained from their vicinities. However, techniques in this category that operate on images reconstructed from depth or disparity maps have the disadvantage of exploiting specific features of the depth maps little, if at all. Those maps represent data having features different from textured two-dimensional (2D) images, such as the absence of texture details and the impact on depth of the relative positions of the objects.

A second category of known techniques operates directly on the depth or disparity maps. For example, the document: "Improving depth maps by nonlinear diffusion", J. Yin and J. R. Cooperstock, Proc. 12th International Conference Computer Graphics, Visualization and Computer Vision, Pizen, Czech Republic, February 2004, describes post-processing applicable to a depth map to enhance the occluded areas or areas with absence of texture. That post-processing is based on filling by non-linear diffusion, i.e. Gaussian smoothing combined with edge detection.

Another technique described in the document "Design Considerations for View Interpolation in a 3D Video Coding Framework", Yannick Morvan, Dirk Farin, and Peter H. N. de With, 27th Symposium on Information Theory in The Benelux, Vol. 1 p., June 2006, Noordwijk, Netherlands, propagates the background by comparing the depth values of the two valid pixels nearest an occluded pixel.

Figure 4A:
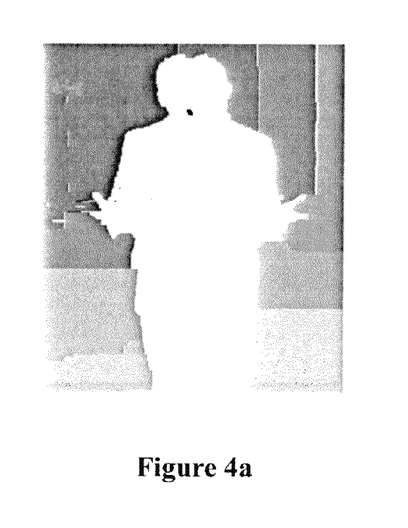
FIGS. 4a and 4b, already commented on, respectively represent a detail from the FIG. 3 disparity map and the same detail after filling occluded areas using a prior art technique.
Figure 4B:
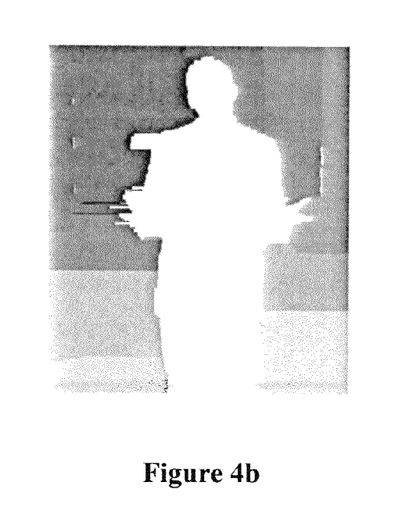

FIGS. 4a and 4b respectively represent a detail of the disparity map from FIG. 3 and the same detail after filling the occluded areas using a known technique based on graph cuts. The image represented in FIG. 4b thus shows the same detail of the disparity map from FIG. 3 but after filling the occluded areas using an algorithm that takes the image line by line and fills an invalid pixel of a occluded area with the first valid (non-occluded) pixel following the invalid pixel on the current line (the direction along the line is a function of the image with which the depth map is associated). Such a filling algorithm is described for example in the document "Occlusions in motion processing", Abhijit Ogale, Cornelia Fermuller, and Yiannis Aloimonos, SpatioTemporal Image Processing, March 2004, London, UK.

In the FIG. 4b image obtained after filling, white areas visible to the left of the person, notably around their right hand, correspond to errors produced when filling the occluded areas. These errors are primarily caused either by pixels of an occluded area for which a value has been assigned in error and that therefore disrupt the filling process, or by the propagation of incorrect values during filling, which causes loss of detail, as around the right hand of the person represented in the image, for example.

Techniques that operate directly on depth or disparity maps thus have the disadvantages of not managing errors or artifacts in occluded areas and/or generating a blurred appearance, notably at the edges of the objects represented, because of the processing applied. Moreover, by comparing only the values of the first valid pixels adjacent an invalid pixel, propagation of the background is not certain, especially with concave objects.

Consequently, the above techniques process only partially defects of depth or disparity maps and the artifacts, propagation of incorrect values, and loss of detail that result from defects of these maps, because the presence of occluded areas causes inconsistency in the reconstructed images and during display in relief using images predicted from depth/disparity maps.

There is therefore a real need to improve the quality of disparity and depth maps, notably in respect of their accuracy around contours of objects.

SUMMARY

To respond in particular to the need as stated above, a first aspect of the present invention provides a method of filling occluded areas of a depth or disparity map.

In this method the map is estimated from at least two images and consists of a matrix of pixels forming a set of lines and columns, each pixel of the map being associated with a depth or disparity value called a "pixel value" and any pixel of an occluded area, called an "invalid pixel", being associated with a pixel value identifiable as being invalid.

According to the invention the method includes:
  processing each line of the map pixel by pixel in a predefined direction; and
  assigning a value to each invalid pixel Pi encountered on a current line, said value being determined as a function of the values associated with the pixels in a predefined vicinity around the first valid pixel P1, if any, that follows the invalid pixel Pi on the current line and the value V(P1) of which corresponds to a greater depth or a lesser disparity relative to the value V(P0) of the last valid pixel P0, if any, that precedes the invalid pixel Pi on the current line.

Such filling of occluded areas obtained by assigning a value obtained as explained above to invalid pixels, makes it possible to propagate the background (i.e. the greatest depth values or lowest disparity values) and only the background, since occluded areas caused by an occluding object are always situated on the same side of objects situated behind the occluding object and that are taken into account in processing the lines in the predefined direction. By constraining the depth (disparity) value assigned to an invalid pixel to be much higher (lower) than the last value from the line before the occluded area, it is certain that the value used to fill the gaps corresponds to the background. Filling the gaps by the method of the invention makes it possible in particular to prevent pixels of an object being propagated, rather than the background, and where appropriate to prevent parts of the image being tied when they should not be, as frequently occurs with concave objects in particular. It is therefore possible in particular to preserve details within the same concave object, for example a person, notably to preserve the distinction between the arms and the hands.

According to preferred features of the method of the invention:
  if there is a valid pixel P0 but there is no a valid pixel P1, then a pixel value is assigned to the invalid pixel Pi and this pixel value is determined as a function of the values associated with the pixels in a predefined vicinity around the first valid pixel P2, if any, that follows the invalid pixel Pi on the current line;
  if there is no valid pixel P2, then a pixel value is assigned to the invalid pixel Pi and this pixel value is determined as a function of the values associated with the pixels in a predefined vicinity around the pixel P0;

if there is no valid pixel P0, a pixel value is assigned to the invalid pixel Pi and this pixel value is determined as a function of the values associated with the pixels in a predefined vicinity around the first valid pixel P2, if any, that follows the invalid pixel Pi on the current line; otherwise, if there is no valid pixel P2, a default value Vd is assigned to the invalid pixel Pi.

In a preferred implementation of the invention, the pixel value assigned to the invalid pixel Pi is determined as a function of the values associated with the pixels in the vicinity of a pixel concerned by application of the median or mean mathematical function to the values of the pixels in the vicinity concerned.

In practice a vicinity around a pixel consists of a block of valid pixels centered on the pixel concerned.

In one particular application in which the depth or disparity map is obtained from a pair of right-hand and left-hand images, the predefined direction of processing a row of pixels of the map corresponds to the direction from right to left if the map is estimated from the left-hand image and to the direction from left to right if the map is estimated from the right-hand image.

The occluded areas are areas that are uncovered on going from one camera to the other, and are therefore essentially situated to the left (respectively to the right) of the objects for the right-hand (respectively left-hand) image for parallel or rectified images (i.e. corresponding to image capture with converging cameras, but where the epipolar lines of the two images have been aligned).

The present invention also provides a method of digitally processing a depth or disparity map including a step of filling occluded areas of the map by a filling method as briefly defined above.

According to particular features of the digital processing method of the invention, the operation of filling the occluded areas may be preceded by:
- an operation of closure morphological filtering intended to eliminate estimation errors in occluded areas of the map; and/or
- an operation of local uniformization of the map using over the whole of the map median filtering of the values of the pixels analyzed per block of predefined size.

In a correlated way, the present invention provides a device for digitally processing a depth or disparity map, this device being noteworthy in that it includes a module for filling the occluded areas of the map adapted to use a filling method of the invention as succinctly defined above.

The invention further provides a digital image processing computer program noteworthy in that it includes instructions for executing a method of the invention for digitally processing a depth or disparity map when the program is executed in a computer system. Here the expression computer system means any processor-based device adapted to process digital data.

The advantages procured by a computer program and a digital processing device of the invention include in particular those mentioned above in relation to the filling method of the invention or the method of the invention for digitally processing a depth/disparity map.

BRIEF DESCRIPTION OF THE DRAWINGS

The invention can be better understood on reading the following detailed description given by way of example only and with reference to the drawings, in which.

DETAILED DESCRIPTION

Figure 5A:
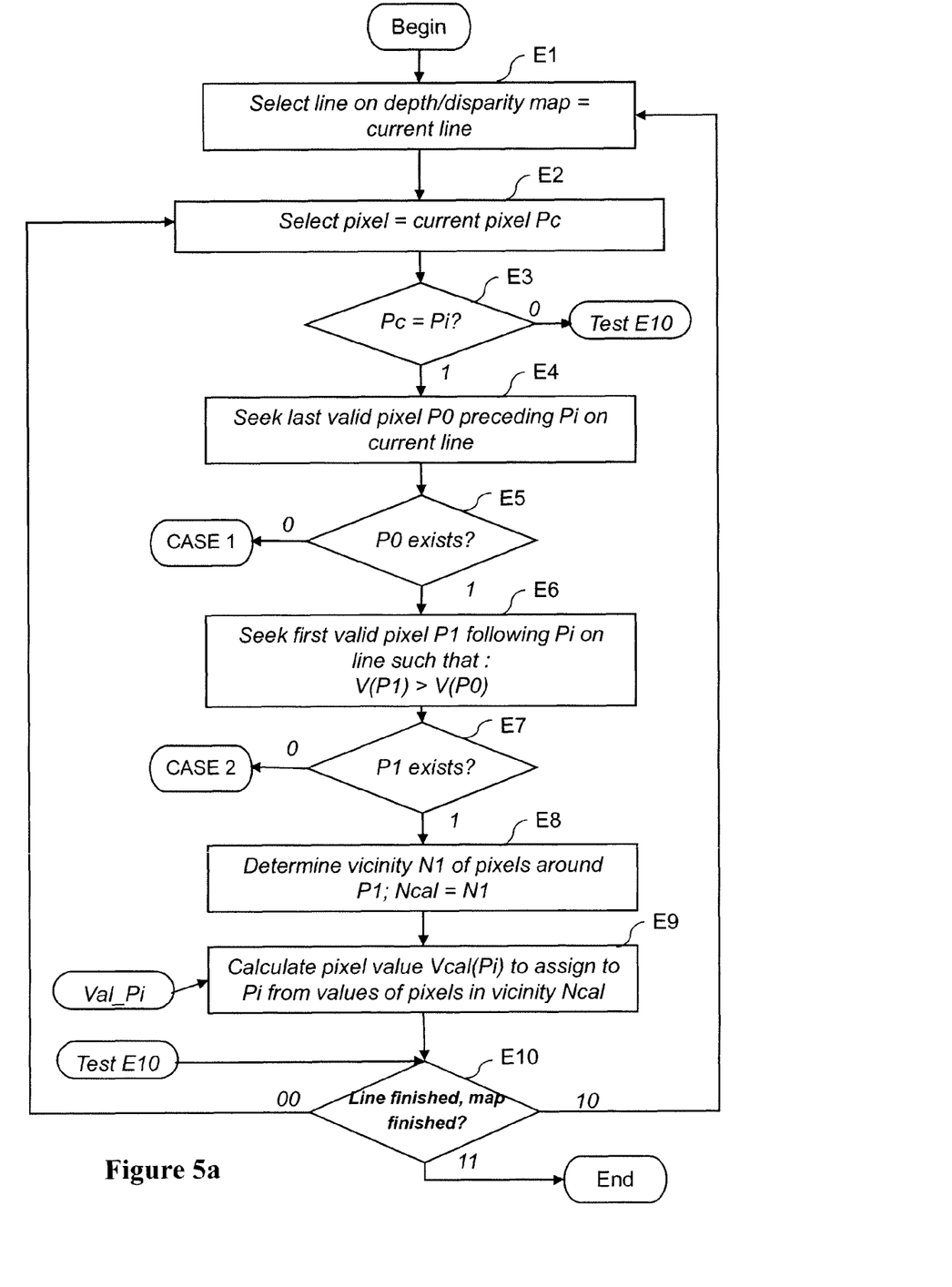
FIGS. 5a and 5b represent a flowchart of the main steps of a method of the invention of filling occluded areas in a depth or disparity map.
Figure 5B:
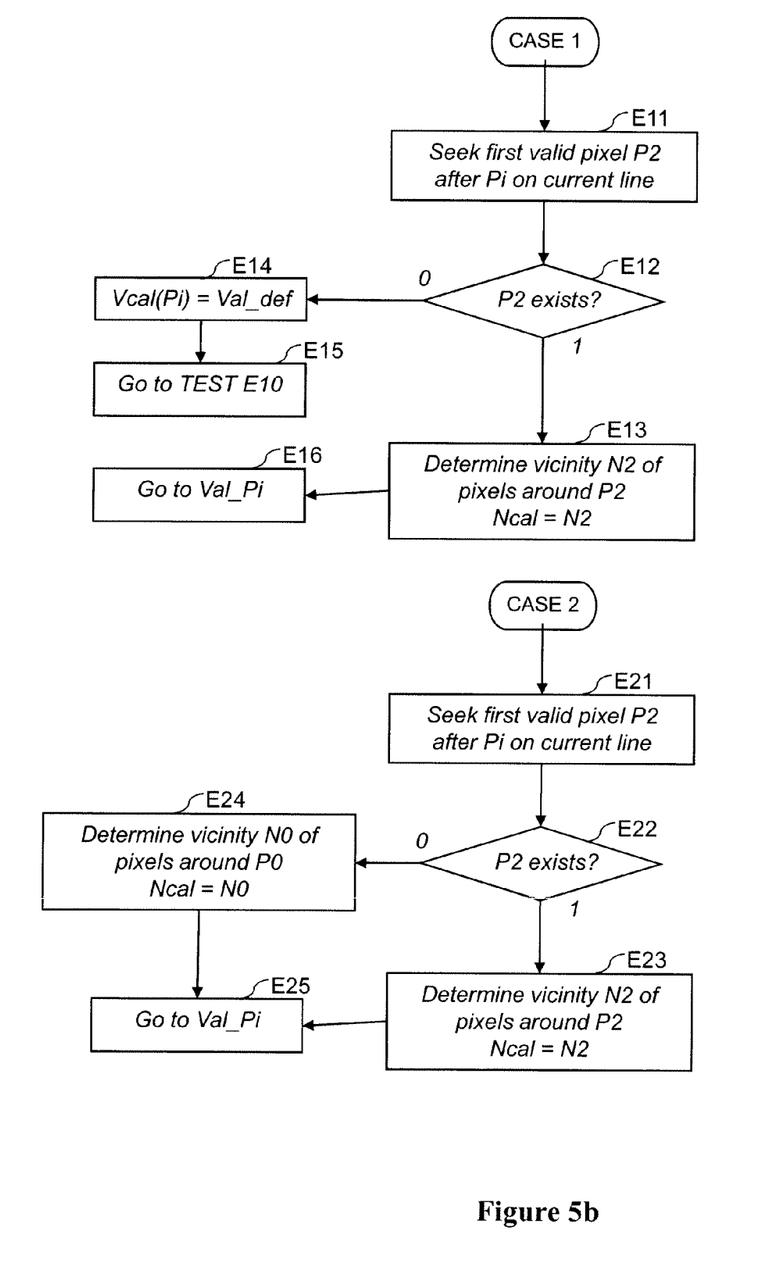

FIGS. 5a and 5b represent a flowchart of the main steps of a method of the invention for filling occluded areas in a depth or disparity map. As mentioned above, the invention applies interchangeably to a depth map or a disparity map because these maps correspond to inversely proportional data.

The method of the invention is applied to a depth or disparity map either estimated from at least two images, for example a right-hand image and a left-hand image, or obtained by prediction from another view, as in prediction from different views based on compression algorithms, for example.

The map in question conventionally consists of a matrix of pixels forming a set of lines and columns. Each pixel of the map is associated with a depth or disparity value called the pixel value. This value is typically a binary value coded on eight bits and able to assume decimal values from 0 to 255 inclusive. Within this range of values, some are valid depth/disparity values and a particular value is an invalid value. Thus if the color chosen to represent occluded areas is white, the associated depth/disparity value is then typically the decimal value 255. Thus a pixel that corresponds to an occluded area of the map is identifiable as being invalid from the associated pixel value.

In practice, the method of the invention for filling occluded areas of a depth/disparity map is implemented by a computer program executed in a data processing system, the map to be processed being stored beforehand in the data processing system. The method of the invention considers the depth/disparity map (referred to below as the map) line by line and, for each line, pixel by pixel. Each line of the map is processed pixel by pixel in a predefined direction Accordingly, in practice, if the map was obtained from a pair of images comprising right-hand and left-hand images, the direction in which a line of pixels of the map is processed corresponds to the right to left direction, if the map was estimated from the left-hand image. In contrast, if the map was estimated from the right-hand image, then the direction in which a line of pixels of the map is processed is from left to right.

As represented in FIG. 5a, the method of the invention for filling occluded areas of a depth/disparity map begins with a step (E1) of selecting a line of the map, referred to as the current line, and then a step (E2) of selecting a pixel from the selected line, referred to as the current pixel Pc.

The test step E3 determines whether the current pixel Pc is an invalid pixel or not, according to whether the associated pixel value corresponds to an invalid value or not (for example the value 255 corresponding to white). Consequently, if the current pixel is valid (test E3, '0'), it does not belong to an occluded area and the test step E10 is then executed to determine whether processing of the current line has been completed and if the map has been processed completely.

Thus if in the step E10 it is determined that processing the current line has not been completed (E10, '00'), there is a return to the step E2 to select the next pixel of the current line. If all of the current line has been processed but not all the lines of the map (E10, '10'), then there is a return to the step E1 to select another line from the map, for example the line immediately below the line that has been processed. Finally, if all the lines of the map have been processed, processing of the map has been completed (E10, '11').

If the current pixel Pc is determined to be invalid in the step E3 (Pc=Pi; E3, '1'), then a search (step E4) is conducted for the last valid pixel, noted P0, preceding the invalid pixel Pi on the line. In practice, when processing any line of the map, information is stored concerning each of the pixels examined (position, validity, associated value, etc.), which makes it possible to obtain very quickly afterwards information relating to a pixel already examined.

If such a pixel P0 exists (E5, '1'), a search is then conducted (step E6) by processing the current line in the predefined direction for a first valid pixel P1 that follows the invalid pixel Pi on the line and is such that the associated pixel value V(P1) corresponds to a depth greater than the value V(P0) of the pixel P0 (or a lower disparity if processing a disparity map). The pixel P1 searched for that corresponds to a greater depth relative to the pixel P0 is symbolized in FIG. 5a by the condition of inequality: V(P1)>V(P0).

In practice, the search for a valid pixel situated after the invalid pixel Pi concerned is effected in a fixed range defined by a plurality of pixels, for example 50 pixels, that the user of the method of the invention is able to modify.

If such a pixel P1 exists (step E7, '1') there is then determined in the step E8 a vicinity N1 of pixels around the pixel P1, after which there is calculated in the step E9 the depth (or disparity) value, noted Vcal(Pi), to be assigned to the invalid pixel Pi.

According to the invention, the depth value Vcal(Pi) is determined as a function of depth (or disparity) values associated with pixels that are in the vicinity N1 of pixels around the pixel P1, the expression "Ncal=N1" in the step E8 symbolically representing the assignment of the vicinity N1 of pixels to calculating the depth value Vcal(Pi).

In practice, a vicinity determined around a pixel could consist of a block of pixels centered on the pixel in question, for example a block consisting of five valid pixels.

In a preferred implementation of the invention, the value Vcal(Pi) to be assigned to the invalid pixel Pi concerned is determined by calculating the mathematical median of the values of the pixels belonging to the pixel vicinity concerned. Alternatively, the mathematical mean may be used instead of the mathematical median. Thus for the vicinity N1 of pixels around the pixel P1, the median of the depth (or disparity) values associated with the pixels of the vicinity N1 is calculated.

Returning to the step E7, if there is no valid pixel P1 that follows the invalid pixel Pi and corresponds to a greater depth relative to the pixel P0 in the current line of the map (step E7, '0'), the processing applied is that designated CASE 2, and illustrated in FIG. 5b. In this situation, a search is conducted (step E21) for the first valid pixel P2 that follows the invalid pixel Pi on the current line. If there is such a pixel P2 (E22, '1'), a vicinity N2 of pixels around the pixel P2 is determined (step E23), as explained above, followed by a return to the step E9 (FIG. 5a) (via the step E25 of FIG. 5b). In the step E9 (noted "Val_Pi") the depth or disparity value, noted Vcal(Pi), to be assigned to the invalid pixel Pi, is calculated as a function of the depth (or disparity) values associated with the pixels in the vicinity N2 of pixels around the pixel P2. In practice, the mathematical median of the depth (or disparity) values associated with the pixels of the vicinity N2 is calculated.

In contrast, if there is no such pixel P2 (step E22, '0') the pixel P0 determined beforehand (step E4) is used and thus a pixel vicinity, noted N0, around the pixel P0 is determined (step E24) as explained above. There follows a return to the FIG. 5a step E9 (via the FIG. 5b step E25). In the step E9, the depth (or disparity) value Vcal(Pi) to be assigned to the invalid pixel Pi is calculated as a function of the depth (or disparity) values associated with the pixels in the vicinity N0 of pixels around the pixel P0. In practice, the mathematical median of the depth (or disparity) values associated with the pixels of the vicinity N0 is calculated.

Finally, in the FIG. 5a step E5, if there is no valid pixel P0 preceding the invalid pixel Pi on the current line (E5 '0'), the processing designated CASE 1, illustrated in FIG. 5b, is applied. In this situation, a search is conducted (step E11) for the first valid pixel P2 which follows the invalid pixel Pi on the current line. If such a pixel P2 exists (E12, '1'), a vicinity N2 of pixels around the pixel P2 is determined as explained previously (step E13), followed by a return to the FIG. 5a step E9 (via the FIG. 5b step E16). In the step E9, the depth (or disparity) value, noted Vcal(Pi), to be assigned to the invalid pixel Pi is calculated as a function of the depth (or disparity) values associated with the pixels in the vicinity N2 of pixels around the pixel P2. In practice, the mathematical median of the depth (or disparity) values associated with the pixels of the vicinity N2 is calculated.

In contrast, if there is no such pixel P2 (step E12, '0'), the pixel Pi is assigned a default value, noted Val_def (step E14). This is followed by a return to the FIG. 5a test E10 described above (step E15).

In practice, the default value Val_def assigned to the invalid pixel Pi is made equal to 128, for example, which corresponds to the mean depth (or disparity).

Figure 6:
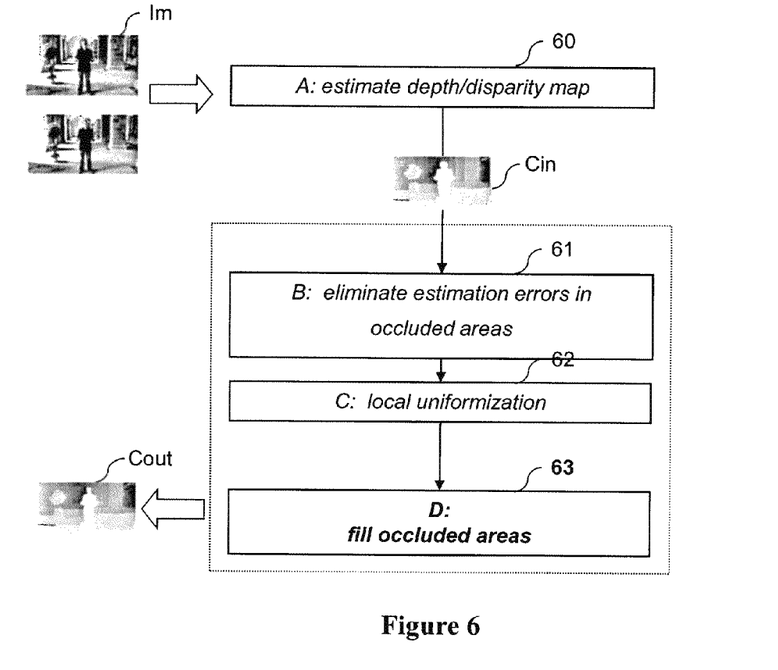
FIG. 6 shows a method and a device for digitally processing a depth/disparity map in one implementation of the invention in which the filling operation is preceded by an operation of elimination of map estimation errors and an operation of local uniformization of the map.

FIG. 6 shows a method and a device of one implementation of the invention for digitally processing a depth/disparity map in which the filling operation is preceded by operations of eliminating map estimation errors and of making the map locally uniform.

As represented in FIG. 6, a device of the invention for digitally processing a depth or disparity map includes a module 63 for filling occluded areas of the map and may further include one or both of two additional modules 61 and 62 of respective functions that are described below. Finally, a device of the invention for digitally processing a depth/disparity map may also include a module 60 for estimating a depth or disparity map from a plurality of images.

In one preferred implementation these modules consist in practice of a set of computer programs including instructions adapted to execute a method of the invention for digitally processing a depth/disparity map. This method is then executed when the above-mentioned set of programs is executed in a computer or data processing system.

In the embodiment represented in FIG. 6, two (right-hand and left-hand) images Im of the same scene are supplied to the software module 60 for executing an operation, noted A, of estimating a disparity map from the two images Im. For example, the module 60 may use an algorithm based on graph cuts, for instance that referred to above and described in the document "Multi-camera scene reconstruction via graph cuts", V. Kolmogorov and R. Zabih, Proceedings of the European Conference on Computer Vision, 2002. As represented in FIG. 3, the module 60 consequently delivers at its output a disparity map Cin.

In the embodiment shown and described, the disparity map Cin is taken up by a module 61 for eliminating estimation errors (known as outliers) produced by the module 60 while estimating the disparity (or depth) map relative to the input images (Im). These errors are essentially caused by occluded areas in the disparity map. In one embodiment, the module 61 applies a known closure morphological filter to the disparity map only in the occluded areas that have not been filled by the disparity estimation algorithm. As shown in FIGS. 4a and 4b, this filtering makes it possible to eliminate outliers in the occluded areas so that they do not disturb the filling of those areas. The morphological filter smoothes gaps in the map and thus makes it possible to prevent errors propagating through subsequent filling of the occluded areas using values from the vicinity of an invalid pixel.

Figure 7A:
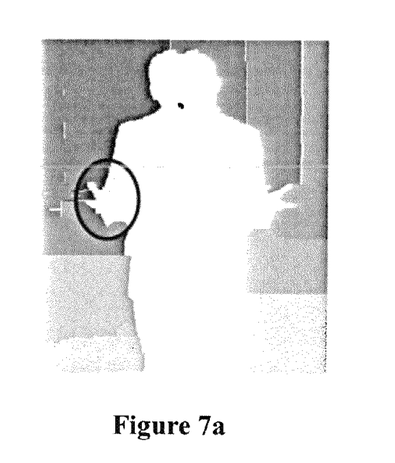
FIGS. 7a and 7b respectively represent the same detail of the map represented in FIG. 4a before application of a morphological filter (FIG. 7a) and after application of the morphological filter (FIG. 7b)
Figure 7B:
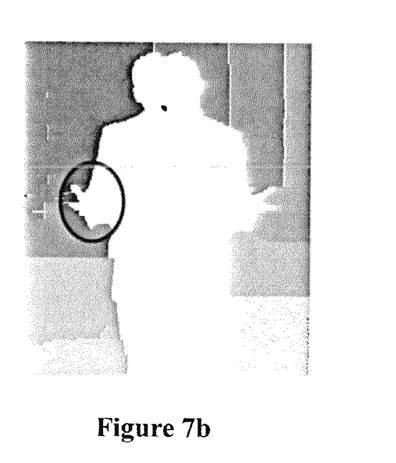

FIGS. 7a and 7b respectively represent the same detail of the disparity map represented in FIG. 4a before application of a morphological filter (FIG. 7a) and after application of the morphological filter (FIG. 7b). Thus two grey points in the ringed area in the left-hand image (FIG. 7a), corresponding to estimation errors present around the right thumb of the person represented in the image, have disappeared in the right-hand image (FIG. 7b).

Referring again to FIG. 6, in the embodiment described, after undergoing the above-mentioned morphological filtering (operation B), the disparity map undergoes a local uniformization operation C executed by the local uniformization module 62.

A second stage of filtering is applied to the disparity map during this operation C. In contrast to the filtering applied during the operation B, this second stage filtering is applied to the whole of the map so as to unformize the disparity map locally whilst preserving thereon all the details of the contours of the objects. Thus the filtering applied makes it possible in particular to eliminate or merge small occluded areas caused by very detailed objects (for example trees) that render the disparity/depth maps highly unstable in time, notably with videos.

The second stage of filtering applied by the module 62 operates in the following manner. The outliers are detected from the complete disparity/depth image. For each pixel of the map, a vicinity V is considered corresponding to all vicinity pixels $v_i$ contained in a block centered on the pixel concerned. The vicinity pixels $v_i$ in the block are studied to evaluate the number of pixels of the block having a similar value and those having a different value from the value associated with the pixel p concerned. The blocks of pixels concerned may be squares with a side length of seven pixels, for example, but the size of the blocks may be modified by the user of the image processing device of the invention as a function of the type of image processed.

The concepts of pixel value similarity and difference are defined with reference to thresholds $s_1$ and $s_3$ in order to render the processing more robust. Thus pixels $v_i$ in a vicinity V around a pixel p are considered similar if the difference between their values is below the threshold $s_1$ (which may be set at 10, for example), expressed as follows:

$$\forall v_i \in V\, v_i \text{ and } p \text{ are similar} \Leftrightarrow |p - v_i| \leq s_1$$

Similarly, the concept of a value difference with reference to a threshold $s_3$, which may be set at 40, for example), is defined as follows:

$$\forall v_i \in V\, v_i \text{ and } p \text{ are different} \Leftrightarrow |p - v_i| \geq s_3$$

For each pixel concerned of the block being analyzed, if the proportion of similar pixels in the block is below a threshold $s_2$ and/or if the proportion of different pixels is above a threshold $s_4$, then the pixel concerned is detected as an outlier (error pixel). The following values may be used, for example: $s_2 = 30\%$ and $s_4 = 60\%$. The correction value to be assigned to a pixel identified as being an outlier is then that obtained by median filtering of the block used to detect the error.

The processing applied is summarized by the following formula:

$$\text{If} \left( \frac{\sum_{v_i \in V} \{|p - v_i| \leq s_1\}}{\sum_{v_i \in V} 1} \geq s_2 \right) \text{OR} \left( \frac{\sum_{v_i \in V} \{|p - v_i| \geq s_3\}}{\sum_{v_i \in V} 1} \leq s_4 \right) \text{then}$$

$$p = \text{median}_{v_i \in V}(v_i)$$

The thresholds $s_1$, $s_2$, $s_3$, $s_4$ used may be modified by the user as a function of the image or the sequence concerned.

Figure 8A:
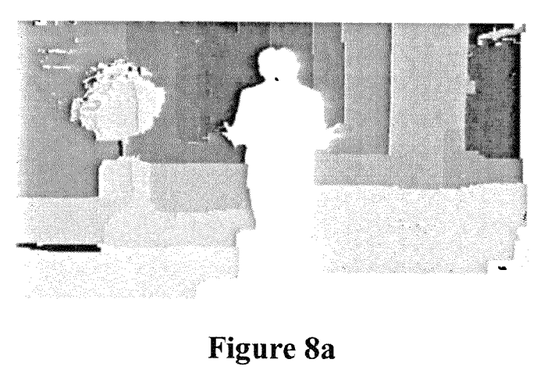
FIGS. 8a and 8b illustrate the result of applying a local uniformization filter to a disparity map obtained after application of a morphological filter, FIGS. 8a and 8b respectively showing the map before and after application of a local uniformization filter.
Figure 8B:
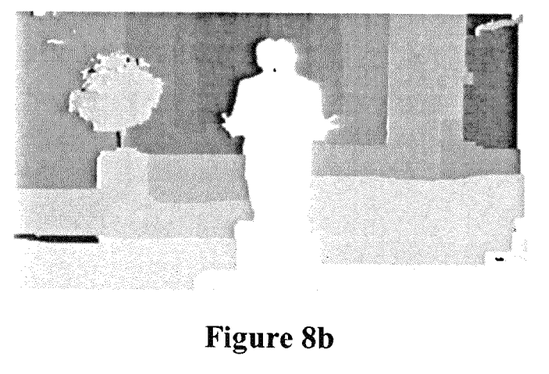

FIGS. 8a and 8b illustrate the result of applying a local uniformization filter as described above to a disparity map obtained after application of a morphological filter as used by the above-mentioned filter module 61. In particular, FIG. 8a as a whole represents the disparity map from which the detail represented in FIG. 7b is taken. FIG. 8b represents the map obtained after application of the uniformization filter to the FIG. 8a map.

As may be seen on comparing FIGS. 8a and 8b, the white spots present in the FIG. 8a image have disappeared in the FIG. 8b image. Accordingly, by means of the local uniformization filtering by the filter module 62 described above, pixels present in the FIG. 8a map that are not geometrically consistent with their vicinity have been processed in the FIG. 8b map.

Figure 9:
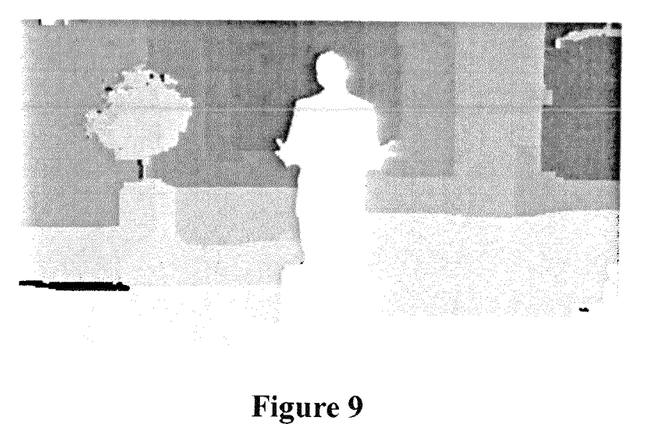
FIG. 9 shows the disparity map from FIG. 8b after processing in accordance with the present invention to fill occluded areas.

Finally, FIG. 9 shows the disparity map from FIG. 8b after the filling module 63 described above has processed it in accordance with the present invention to fill occluded areas.

Comparing the FIG. 9 map with the initial map represented in FIG. 3 and with the detail of the same map represented in FIG. 4b and obtained after processing of the map by a prior art filling method, the following points in particular are seen in relation to the FIG. 9 map obtained in accordance with the invention:

it appears much more uniform; and
the occluded areas around the person have disappeared, without losing the accuracy of the details, for example around the right hand of the person.

The invention claimed is:

1. A method of filling occluded areas of a depth or disparity map estimated from at least two images and consisting of a matrix of pixels forming a set of lines and columns, each pixel of the map being associated with a depth or disparity value, called pixel value, and any pixel of an occluded area, called invalid pixel, being associated with a pixel value identifiable as being invalid, said method comprising:

a step of processing each line of the map, pixel by pixel, in a predefined direction; and a step of assigning a pixel value to each invalid pixel Pi encountered on a current line, said pixel value being determined as a function of the values associated with the pixels in a predefined vicinity around a chosen pixel or being a predefined default value, comprising if there is a last valid pixel P0 that precedes the invalid pixel Pi on the current line, and there are one or more valid pixels that follow the invalid pixel Pi on the current line, searching among said valid pixels that follow the invalid pixel Pi for a first valid pixel P1 the value V(P1) of which corresponds to a greater depth or a lesser disparity relative to the value V(P0) of the last valid pixel P0, and if said pixel P1 is found choosing said pixel P1 as said chosen pixel;

if there is a valid pixel P0 and there are one or more said valid pixels that follow the invalid pixel Pi but there is no valid pixel P1, choosing the first valid pixel P2 that follows the invalid pixel Pi as said chosen pixel, if there is no valid pixel P0 but there are one or more said valid pixels that follow the invalid pixel Pi, choosing the first valid pixel P2 that follows the invalid pixel Pi as said chosen pixel, if there is a valid pixel P0 but there is no valid pixel P2, choosing said last valid pixel P0 as said chosen pixel, and said assigned pixel value being a predefined default value Vd if there is no valid pixel P0 and no valid pixel P2.

2. The method according to claim 1, wherein the pixel value assigned to the invalid pixel Pi is determined as a function of the values associated with the pixels in the vicinity of a pixel concerned by application of the median or mean mathematical function to said values of pixels in the vicinity concerned.

3. The method according to claim 1, wherein a vicinity around a pixel concerned consists of a block of valid pixels centered on the pixel concerned.

4. The method according to claim 1, wherein said depth or disparity map is obtained from a pair of right-hand and left-hand images and wherein the predefined direction of processing a row of pixels of the map corresponds to the direction from right to left if the map is estimated from the left-hand image and to the direction from left to right if the map is estimated from the right-hand image.

5. A method of digitally processing a depth or disparity map, comprising an operation of filling occluded areas using the method according to claim 1.

6. The processing method according to claim 5, wherein the operation of filling the occluded areas is preceded by an operation of closure morphological filtering eliminating estimation errors in occluded areas of the map.

7. The processing method according to claim 5, wherein the operation of filling the occluded areas is preceded by an operation of local uniformization of the map using over the whole of the map median filtering of the values of the pixels analyzed per block of predefined size.

8. A device for digitally processing a depth or disparity map, comprising a module for filling occluded areas of the map adapted to use the filling method according to claim 1.

9. The device according to claim 8, further comprising a closure morphological filter module for eliminating estimation errors in occluded areas of the map before the filling of the occluded areas.

10. The device according to claim 8, further comprising a module for local uniformization of the map using over the whole of the map median filtering of the pixel values analyzed per block of predefined size before the filling of the occluded areas.

11. A non-transitory computer readable medium having instructions recorded thereon, the instructions being adapted to execute the method according to claim 1 when executed in a computer system.

* * * * *